United States Patent [19]

Forster et al.

[11] 4,237,110
[45] Dec. 2, 1980

[54] PROCESS FOR SEPARATING AND RECOVERING CONCENTRATED HYDROCHLORIC ACID FROM THE CRUDE PRODUCT OBTAINED FROM THE ACID HYDROLYSIS OF CELLULOSE

[75] Inventors: Allen V. Forster; Lyle E. Martz; Douglas F. Leng, all of Midland, Mich.

[73] Assignee: The Dow Chemical Company, Midland, Mich.

[21] Appl. No.: 34,784

[22] Filed: Apr. 30, 1979

[51] Int. Cl.² .................. C01B 7/08; C13K 1/04
[52] U.S. Cl. .................. 423/488; 127/37; 127/46 R
[58] Field of Search .......... 127/37, 46 R; 423/481, 423/488

[56] References Cited

U.S. PATENT DOCUMENTS

| | | | |
|---|---|---|---|
| 1,964,646 | 6/1934 | Oxley et al. | 127/37 |
| 2,840,605 | 6/1958 | Leonard | 127/37 |
| 3,186,809 | 6/1965 | Kreevoy | 423/488 |
| 3,854,995 | 12/1974 | Okabe | 127/37 |
| 4,036,939 | 7/1977 | Duhayon | 423/488 |

FOREIGN PATENT DOCUMENTS 609092 2/1979 Switzerland .................. 127/37

OTHER PUBLICATIONS

Crittendon, E. "Extraction of Hydrogen Chloride From Aqueous Solutions" *Industrial and Engineering Chemistry*, Feb. 1954, pp. 265-273.

Wenzl, The Chemical Technology of Wood, Academic Press, NY (1970), pp. 157-199.

Mrnka "Extraction of Monobasic Acids by Amines" *Proc. Int. Solvent Extraction Conf.* 1974, Soc. Chem. Ind., London, vol. 1, pp. 49-62.

Blumberg, *Proc. Int. Solvent Extraction Conf.* 1974, Soc. Chem. Ind., London, vol. 3, pp. 2789-2803.

*Primary Examiner*—Brian E. Hearn
*Attorney, Agent, or Firm*—G. R. Plotecher

[57] ABSTRACT

The crude product obtained from the acid hydrolysis of cellulose, the product comprising concentrated hydrochloric acid and the various sugars obtained from the acid hydrolysis of cellulose, is separated into a first fraction comprising concentrated hydrochloric acid and a second fraction comprising the sugars by a process comprising:

(1) contacting the crude product with an organic solvent consisting essentially of at least one $C_5$-$C_9$ alcohol such that the organic solvent is enriched with the concentrated hydrochloric acid,
(2) separating the enriched organic solvent from the concentrated hydrochloric acid depleted crude product, and
(3) recovering the concentrated hydrochloric acid from the enriched organic solvent.

9 Claims, 5 Drawing Figures

PROCESS FOR SEPARATING AND RECOVERING CONCENTRATED HYDROCHLORIC ACID FROM THE CRUDE PRODUCT OBTAINED FROM THE ACID HYDROLYSIS OF CELLULOSE

BACKGROUND OF THE INVENTION

1. Field of the Invention

This invention relates to the separation and recovery of a concentrated acid from an aqueous solution and more particularly, to the separation and recovery of concentrated hydrochloric acid from the crude product obtained from the acid hydrolysis of cellulose.

2. Description of the Prior Art

Wood and other lignocellulosic materials have long been known as a source of various sugars, such as glucose, useful in the food and chemical industry. These sugars can be produced by the acid hydrolysis and saccharification of wood or other plant material containing cellulose in solid, divided form. Strong mineral acids, such as concentrated (greater than about 20 weight percent) hydrochloric acid, are throught to be the preferred acids for the hydrolysis of cellulose as noted by H. F. J. Wenzl, *The Chemical Technology of Wood*, Academic Press (New York, 1970).

Hydrolysis with concentrated acid of a lignocellulosic material produces a crude product comprising concentrated acid and the various sugars obtained from the hydrolysis of cellulose. For such processes to be commercially feasible, the concentrated acid must be economically separated and recovered, preferably then recycled to the hydrolysis reaction. Present separation and recovery technology is essentially evaporation, such as that described in Swiss Pat. No. 609,092. There the crude product is dried by direct contact with a stream of hot gas, such as air, to produce a powdery mixture comprising the sugars formed by hydrolysis. The sugars are then recovered from the powdery mixture by contacting the mixture with water. While this method is operable, it is undesirable because it it both energy and capital intensive. Moreover, the high temperatures associated with this method of recovery promote thermal degradation of the hydrolysate sugars and thus the recovered sugars may contain significant amounts of reversion sugars, i.e., oligomers of glucose, xylose, etc.

Use of solvent extraction to separate and recover concentrated acid and simultaneously concentrate the sugars from the crude product would be desirable because it is less energy and capital intensive than evaporation technology. Moreover, if such a recovery method could be operated at relatively ambient temperatures, then the formation of reversion sugars would not be promoted (at least to the extent of the evaporation method). However, the present art does not offer solvent extraction technology useful for this particular separation and recovery. For example, Crittenden et al., "Extraction of Hydrogen Chloride from Aqueous Solutions", *Ind. and Eng. Chem.*, 265 (February 1954) teach the use of various aliphatic alcohols for the recovery of dilute hydrochloric acid from aqueous streams but contains no discussion with regard to the separation and recovery of concentrated hydrochloric acid from mixtures containing the acid in combination with hydrolysis sugars.

Mrnka et al., "Extraction of Monobasic Acids by Amines", *Proc. Int. Sol. Ext. Conf.*, Vol. 1, (1974), teach the use of various amines for the extraction of monobasic acids from aqueous solutions.

Blumberg et al., "Interesting Aspects in the Development of a Novel Solvent Extraction Process for Producing Sodium Bicarbonate", *Proc. Int. Sol. Ext. Conf.*, Vol. 3, 2789 (1974), also teach the use of amines for extracting hydrochloric acid from an aqueous solution.

Duhayon et al., U.S. Pat. No. 4,036,939, teach the recovery of hydrogen chloride in gaseous form from an organic solvent loaded with hydrochloric acid in a dilute aqueous solution by dehydrating the loaded organic solvent in a dehydration extractor in which the solvent is circulated countercurrent to an aqueous solution having a high chloride concentration. The organic solvent loaded with dilute hydrochloric acid is selected from the group of aliphatic alcohols having preferably a relatively high molecular weight, such as 2-methyl-butanol-4.

Kreevoy et al., U.S. Pat. No. 3,186,809, teach the use of dodecylphenol as a synergistic additive in the amine extraction of inorganic mineral acids from aqueous solutions.

SUMMARY OF THE INVENTION

According to this invention, the crude product obtained from the hydrolysis of cellulose with concentrated hydrochloric acid, the product comprising concentrated hydrochloric acid and the sugars obtained from the acid hydrolysis of cellulose, is separated into a first fraction comprising the concentrated hydrochloric acid and a second fraction comprising the sugars, the process comprising:

(1) contacting the crude product with an organic solvent consisting essentially of at least one $C_5$–$C_9$ alcohol such that the organic solvent is enriched with the concentrated hydrochloric acid, (2) separating the enriched organic solvent from the concentrated hydrochloric acid depleted crude product, and (3) recovering the conentrated hydrochloric acid from the enriches organic solvent.

This invention operates at mild conditions and with relatively low energy requirements, produces a high yield of both hydrolysis sugars and concentrated hydrochloric acid, and employs known, relatively inexpensive extracting agents.

DETAILED DESCRIPTION OF THE INVENTION

Figure 1:
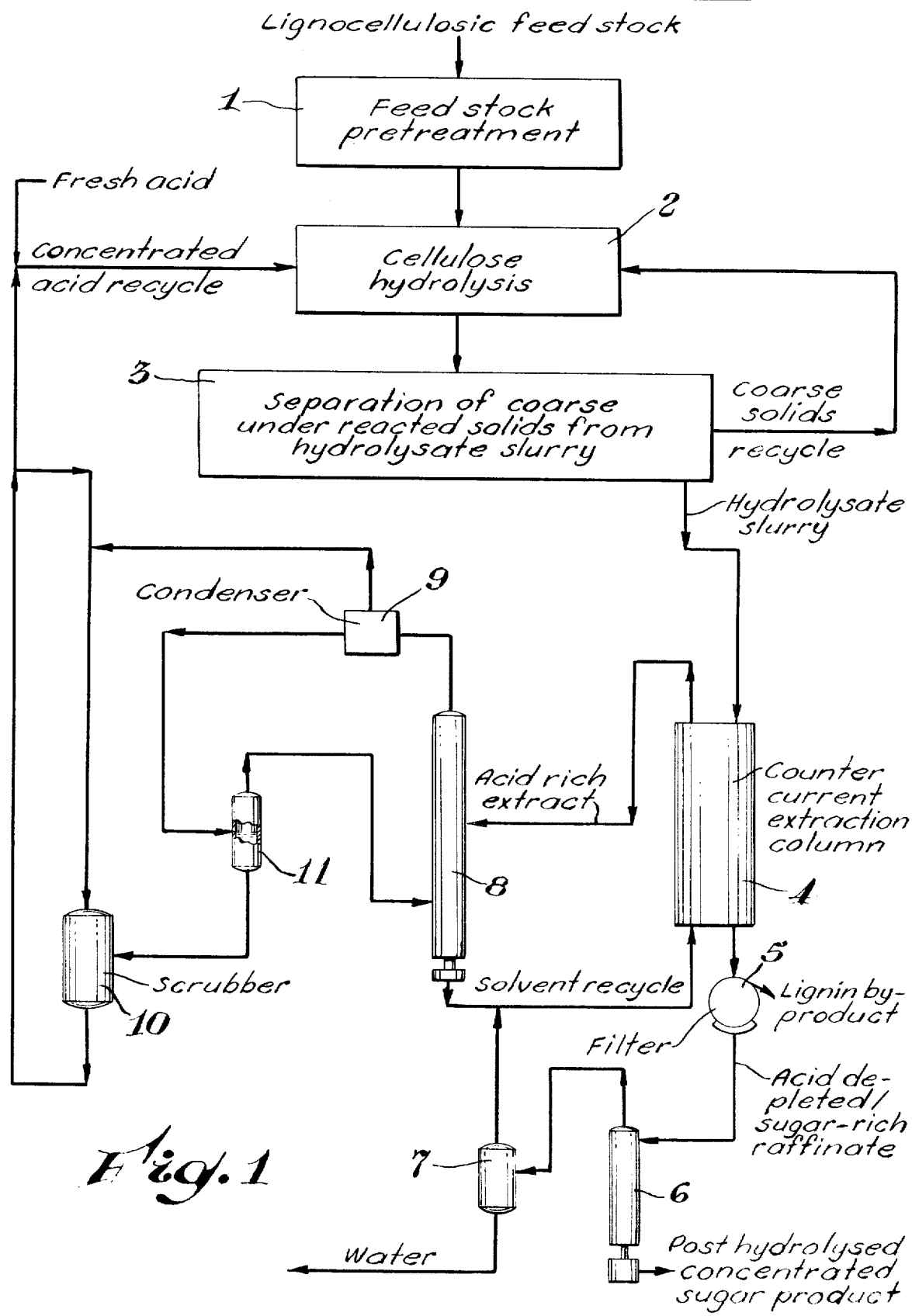
FIG. 1 is a schematic diagram of a one-stage cellulose hydrolysis process.

Any material having a cellulosic content can be the source of cellulose for this invention. Typical sources include: forest materials, such as wood, bark, etc.; agricultural materials, such as corn and grain husks, plant stems, rinds, leaves, plant fruit and tumors, etc.; manufacturing residues, such as cotton fiber wastes, forest products wastes, etc.; municipal residues, such as paper, paper products, etc.; and the like. The presence of other natural constituents, such as starch, lignin, etc., during the hydrolysis and recovery steps are generally not deleterious to this invention.

The strength of the hydrochloric acid here used will vary with the temperature and pressure employed in the hydrolysis step. The lower the temperature and pressure at this step, generally the stronger the acid strength (concentration). Where, as in a preferred embodiment of this invention, the hydrolysis of cellulose is performed at relatively ambient temperature and pressure (about 15° C.–30° C. and 1 atmosphere), the concentrated hydrochloric acid is at least about a 20 weight percent, and preferably between about a 30 and 45 weight percent, aqueous solution of hydrogen chloride. This invention is particularly useful in recovering at least a 20 weight percent, most notably a 34–45 weight percent, aqueous solution of hydrogen chloride from a crude product of the acid and the sugars obtained from the acid hydrolysis of cellulose.

The $C_5$–$C_9$ alcohols of this invention are all the primary, secondary and tertiary isomers of pentanol, hexanol, heptanol, octanol and nonol. The hydrocarbon portion of the alcohol can be straight chain or branched, the latter illustrated by 2-methyl-1-pentanol, 2-ethyl-1-hexanol, etc. The cyclic alcohols, such as cyclohexanol and cycloheptanol are also included among the $C_5$–$C_9$ alcohols here used. The primary isomers are preferred to the secondary and tertiary isomers and n-hexanol, 2-ethyl-1-hexanol and 2-ethyl-1-butanol are the preferred alcohols. Any of the alcohols can be used either alone or in combination with one another.

Preferably, the organic solvent ($C_5$–$C_9$ alcohols) of this invention is used neat, i.e., in the absence of a diluent. However, a diluent can be employed if desired and suitable diluents are characterized generally by a relatively low viscosity at room temperature and atmospheric pressure and essentially inert to the process materials at process conditions. In one embodiment of this invention, the concentrated hydrochloric acid is recovered from the concentrated hydrochloric acid enriched organic solvent by distillation. In this embodiment, the diluent is further characterized by having a distillation temperature or boiling point substantially above the acid-water azeotrope found in the enriched organic solvent. For example, the acid-water azeotrope of 25 weight percent hydrochloric acid is about 109° C. and thus a suitable diluent under such conditions preferably has a distillation temperature in excess of about 120° C. Illustrative diluents include: hydrocarbon mixtures, such as kerosene; chlorinated hydrocarbons, such as 1,2,3-trichloropropane; aromatics, such as o-ethyltoluene or any one of the isomeric xylenes; and various polyglycol ethers, such as DOWANOL® PiBT (a polyglycol ether having a boiling point in excess of 175° C. manufactured by The Dow Chemical Company). If a diluent is employed, preferably it demonstrates some extractive affinity for the concentrated hydrochloric acid. DOWANOL® PiBT is such a diluent.

When the organic solvent of this invention consists essentially of the $C_5$–$C_9$ alcohols in combination with at least one diluent, preferably the organic solvent consists essentially of at least about 15 weight percent and more preferably of about 30 weight percent, based upon the total weight of the organic solvent, of the $C_5$–$C_9$ alcohols. While the use of a more dilute $C_5$–$C_9$ alcohol concentration is operable, the economies of such a practice are undesirable.

The organic solvent is used in the same manner as known organic solvents in solvent extraction. Preferably, the crude product and organic solvent are contacted in a countercurrent fashion, and more preferably in a countercurrent fashion wherein the organic solvent passes up and through an extraction column while the crude product simultaneously passes down and through the same column. The solvent flow rate is determined by the partition coefficient and the number of theoretical stages used in such an extraction. Generally, a high partition coefficient or a large number of theoretical stages minimizes the solvent to feed ratio required. Because the organic solvent of this invention has a relatively higher capacity for concentrated hydrochloric acid than do most known organic solvents, this organic solvent can be used at lower solvent to feed ratios than previously practical.

A plurality of factors are material to the design of the organic solvent. The more prominent factors include: a high partition coefficient for concentrated hydrochloric acid, low solubility in the hydrolysate sugar-rich raffinate, a minimum tendency to emulsify, essentially reactively inert (particularly to chlorine or chloride ion), a distillation temperature substantially above the water-acid azeotrope found in the enriched organic solvent, and availability at minimal cost. Furthermore, the hydrolysate sugars should preferably have a relatively low solubility in the enriched organic solvent thus minimizing sugar losses during solvent recovery and recycle. Factors such as these have identified as a preferred organic solvent a mixture consisting essentially of between about 60 and 90 weight percent 2-ethyl-1-hexanol and between about 10 and about 40 weight percent n-hexanol. 2-Ethyl-1-hexanol demonstrates excellent sugar rejection characteristics and relatively low capacity for concentrated hydrochloric acid. n-Hexanol demonstrates an excellent capacity for concentrated hydrochloric acid and relatively poor sugar rejection characteristics. Combined, these two alcohols constitute a preferred organic solvent of this invention. Other preferred organic solvents include a mixture between about 55 and about 85 weight percent 2-ethyl-1-hexanol and about 15 and about 45 weight percent DOWANOL® PiBT, and essentially 100 weight percent 2-ethyl-1-butanol.

The temperature and pressure considerations are not critical to the practice of this invention other than being sufficient to maintain the organic solvent as a liquid and the crude product as a fluid slurry. However, the invention lends itself well to practice at relatively mild conditions, such as between about 15° C. and about 30° C. and at atmospheric pressure and such conditions are employed for reasons of economy and convenience.

The hallmark of this invention is the use of the $C_5$–$C_9$ alcohols to separate and recover concentrated hydrochloric acid from the crude product obtained from the acid hydrolysis of a lignocellulosic material. These particular alcohols under countercurrent solvent extraction conditions efficiently and economically separate and recover the concentrated hydrochloric acid such that the acid is suitable for recycle to the hydrolysis reaction. After the separation and recovery of the concentrated hydrochloric acid, the sugars of the crude product are suitable for further refinement and processing.

The following examples are illustrative embodiments of this invention. Unless indicated to the contrary, all parts and percentages are by weight.

SPECIFIC EMBODIMENTS

Background

Schematic Diagram of Cellulose Hydrolysis Process

FIG. 1 describes briefly a one-stage cellulose hydrolysis process. A lignocellulosic feedstock is introduced into a feedstock pretreatment unit 1 where, among other preconditioning activities, the cellulose is suitably ground to a desirable size. The pretreated cellulose is then passed to a hydrolysis reactor 2 where it is admixed with concentrated hydrochloric acid. The ripened or reacted acid-sugar mixture is then passed to a solids separation unit 3 where under-reacted coarse solids are removed for recycle to reactor 2. The remainder of the mixture, hydrolysate slurry containing fine lignin particles, is passed from separator 3 to a countercurrent extraction column 4. The hydrolysate slurry is passed down and through column 4 while a solvent of this invention is simultaneously passed up and through column 4. An acid-depleted sugar/lignin-rich raffinate is recovered as an underflow from column 4 and then passed to a lignin separation filter 5. Any residual solvent is steam-stripped from the sugars in stripping column 6. A post-hydrolyzed, concentrated sugar product is then recovered as an underflow from column 6 while a water-solvent mixture is removed overhead from column 6 and passed to a separation unit 7. There, the solvent is recovered from the water-solvent mixture and subsequently recycled through extraction column 4.

Removed overhead from extraction column 4 is an acid-rich solvent extract which is passed to distillation column 8. There, a water-acid-solvent azeotrope is removed overhead while essentially acid-free solvent is removed as an underflow. This underflow is then combined with the solvent recovered from separation unit 7 and the combination is cooled and recycled to extraction column 4. The gaseous azeotrope overflow from distillation column 8 is passed through a partial condenser 9 with the noncondensible gases passed to scrubber unit 10. The condensibles from condenser 9 are passed to separator 11 where a light organic phase is separated from a heavy, acid-rich aqueous phase. The organic phase is returned to column 8 while the aqueous phase is passed to scrubber 10. There, concentrated acid is recovered and recycled to reactor 2.

Figure 2:
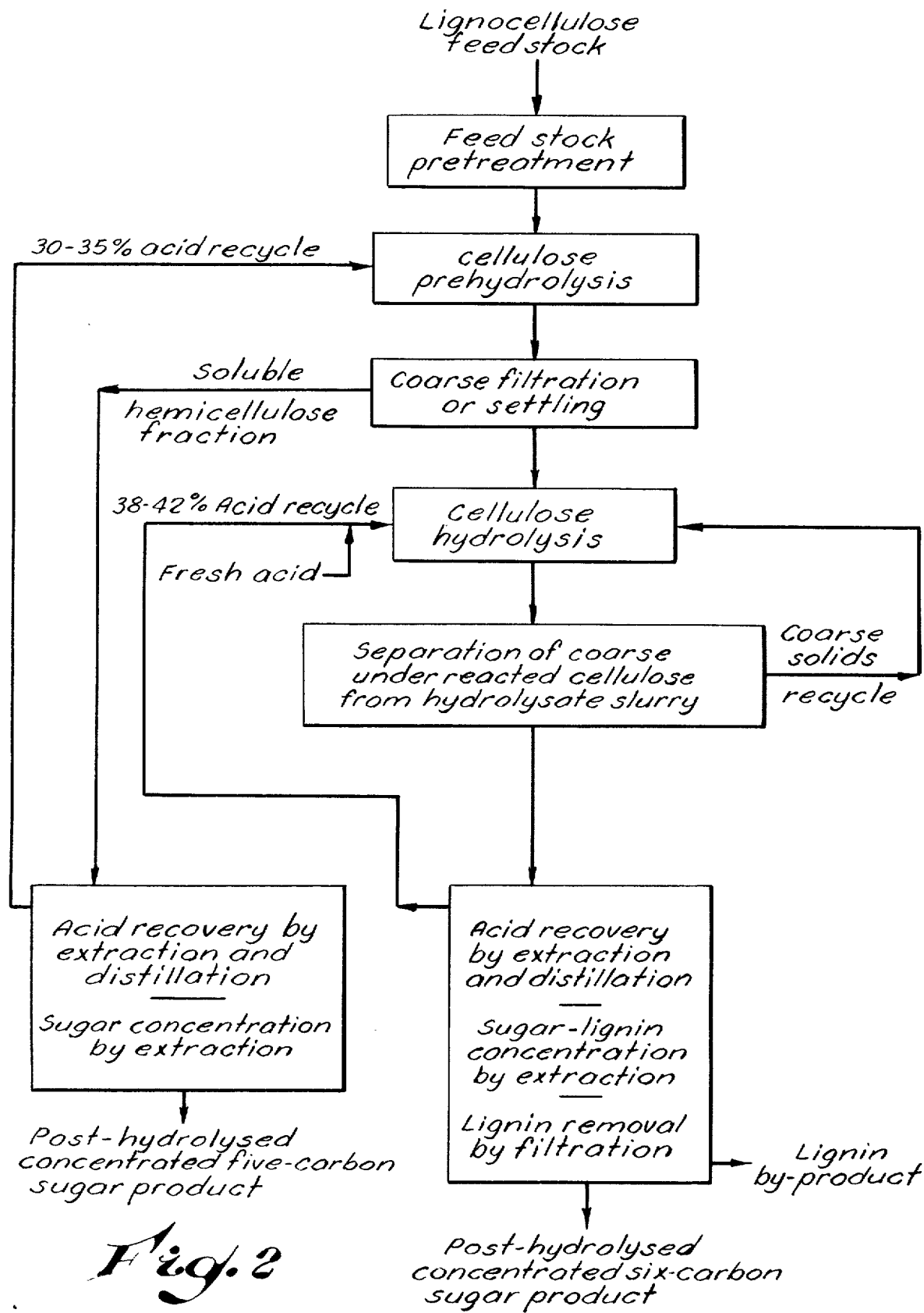
FIG. 2 is a schematic flow-chart of a two-stage cellulose hydrolysis process.

FIG. 2 is a schematic flow diagram illustrating a two-stage cellulosic hydrolysis process. As with a one-step process, a lignocellulosic feedstock is fed to a feedstock pretreatment unit for, among other things, reduction to a suitable size. The pretreated feedstock is then passed to a prehydrolysis unit where it is generally admixed with concentrated acid but typically an acid of less strength (about 30–35 weight percent) than that used in the one-stage process or in the subsequent hydrolysis step of this two-stage process (about 38–42 weight percent). After prehydrolysis, the reaction mass is separated by either coarse filtration or settling into a soluble hemicellulose fraction and an un- or underreacted fraction. The hemicellulose fraction is then subjected to various recovery techniques where the acid is recovered and recycled to the prehydrolysis unit and the product, typically a five-carbon sugar, is subsequently isolated. The un- or underreacted fraction is passed to a hydrolysis reactor where a procedure similar to FIG. 1 begins.

FIGS. 1 and 2 thus represent two cellulose hydrolysis processes which employ the concept subsequently demonstrated through the following examples.

Data Generation:

Equilibrium and tie-line data were generated at 25° C. for extraction of concentrated hydrochloric acid from synthetic and actual hydrolysate mixtures. The sugar concentration in all runs varied between 3 and 36 weight percent. The data were smoothed and used to develop pseudo-ternary extraction plots (hydrochloric acid-water/sugar-solvent). Mass transfer data were generated in a 10-foot Karr extraction column and used in conjunction with the ternary plots to identify optimum extractor configuration and operating conditions. Extract samples were introduced into a continuous, center-fed, twenty plate Oldershaw distillation column. Concentrated hydrochloric acid was recovered in the overhead distillate while the acid-depleted, solvent-rich raffinates were recovered for recycle to the extractor column. Hydrochloric acid content in both organic and aqueous phases was determined by titration with sodium hydroxide. Solvent and water content was determined from pseudo-ternary diagrams and sugar content in the aqueous phase was determined by liquid chromatography. Solvent degradation properties were determined by gas chromatography.

EXAMPLE 1

Extraction and recovery of concentrated hydrochloric acid from a synthetic hydrolysate mixture using 75:25 weight ratio 2-ethyl-1-hexanol:n-hexanol.

Figure 3:
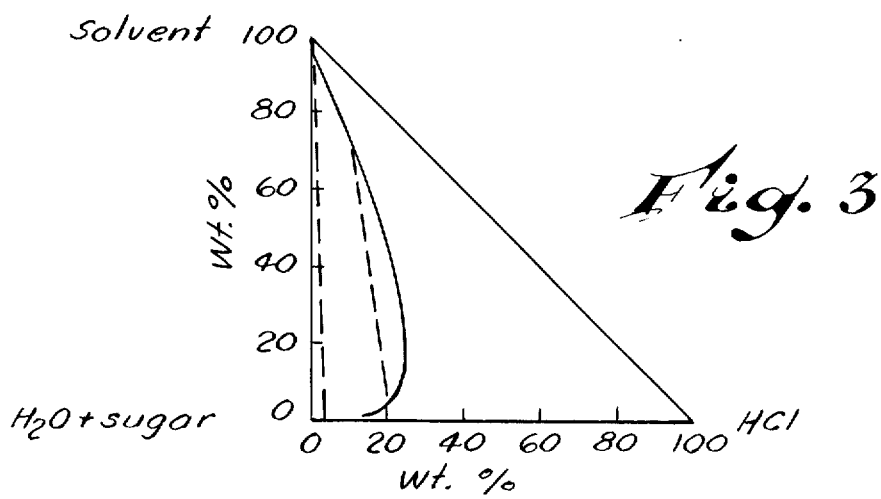
FIG. 3 is a pseudo-ternary diagram for extraction of concentrated hydrochloric acid (34–38 weight percent) from an actual hydrolysate mixture using the solvents of Examples 1 and 2.

FIG. 3 is a pseudo-ternary diagram generated for extraction of an actual hydrolysate mixture using the solvent system defined in the Example title.

The following tables summarize the results obtained when concentrated hydrochloric acid was separated from a synthetic hydrolysate mixture. Separation was accomplished in a continuous, countercurrent fashion by a Karr extraction column.

TABLE I

| Extractor Operating Conditions | | |
|---|---|---|
| Item | Value | Unit |
| Diameter | 1 | inch |
| Stroke Length | ⅛ | inch |
| Plate Spacing | 1 | inch |
| No. of Plates | 120 | — |
| Active Plate Height | 10 | foot |
| Agitation | 150 | per minute (pm) |
| Agitation Intensity | 75 | pm × stroke/spacing |
| Temperature | 25 | °C. |
| Time at Conditions | 120 | minute |

TABLE II

| | Extraction Results | | | | | | | | | | |
|---|---|---|---|---|---|---|---|---|---|---|---|
| | Hydrolysate | | Solvent | | Extract | | | Raffinate | | | |
| Component | Wt. % | Flow g/min | Wt. % | Flow g/min | Wt. % | Flow g/min | HCl Recov. % fed | Wt. % | Flow g/min | HCl Loss % fed | Sugar Recov. % fed |
| HCl | 31.5 | — | 0 | — | 12.0 | — | 89.0 | 12.0 | — | 8.0 | — |
| H₂O | 56.1 | — | 0 | — | 19.0 | — | — | 53.8 | — | — | — |
| Glucose | 12.4 | — | 0 | — | 2.0 | — | — | 33.2 | — | — | 63.0 |
| 2-Ethyl-1-Hexanol | 0 | — | 75.0 | — | 50.0 | — | — | 0.75 | — | — | — |
| n-Hexanol | 0 | — | 25.0 | — | 17.0 | — | — | 0.25 | — | — | — |
| Total | 100.0 | 34.0 | 100.0 | 51.0 | 100.0 | 77.0 | 89.0 | 100.0 | 8.0 | 8.0 | 63.0 |

Table II demonstrates that 89 percent of the hydrogen chloride fed to extractor column was recovered in the acid-rich extract phase. The quality of the countercurrent hydrochloric acid was 39 weight percent on a solvent-free basis. The glucose was simultaneously concentrated more than 2½-fold (from a hydrolysate concentration of 12.4 weight percent to a raffinate concentration of 33.2 weight percent). Because fresh solvent was used in this experiment, only 63 percent of the sugar fed to the extractor was recovered in the raffinate phase. However, in practice a recycled solvent quickly becomes saturated with sugar and thus any sugar losses are minimized.

The following tables summarizes the results obtained when an acid-rich extract sample, as described in Table II, is continuously distilled to recover concentrated hydrochloric acid.

TABLE III

| Distillation Column Operating Conditions | | |
|---|---|---|
| Item | Value | Unit |
| Type | Sieve plate | — |
| Diameter | 28 | mm |
| No. of Plates | 20 | — |
| Feed Plate | 10 | — |
| Distillate Condenser | Partial | — |
| Noncondensibles Recovery | Water scrubber | — |
| L/D* | 2:1 | wt:wt |
| Azeotrope Distillate | Heterogeneous | — |
| phase ratio | 0.4:1 | Organic:Aqueous |
| Feed Flows | 330 | g/hr |
| Bottoms Flows | 240 | g/hr |
| Distillate Flows | 90 | g/hr |
| Feed Temp. | 98 | °C. |
| Bottoms Temp. | 150 | °C. |
| Distillate Temp. | 109 | °C. |

*L/D = Liquid reflux to distillate withdrawal ratio.

TABLE IV

| | Continuous Distillation Results | | | | | | | | | | |
|---|---|---|---|---|---|---|---|---|---|---|---|
| | Extract Feed | | Solvent Bottoms | | | Concentrated Acid Distillate | | | | | |
| | | | | | | Aqueous | | | Organic | | |
| Component | Wt. % | Flow g/min | Wt. % | Flow g/min | HCl Recov. % fed | Wt. % | Flow g/min | HCl Recov. % fed | Wt. % | Flow g/min | HCl Recov. % fed |
| HCl | 12.0 | — | 1.0 | — | 6.1 | 40.0* | — | 73.0 | 10.6 | — | 5.0 |
| H₂O | 19.0 | — | 1.5 | — | — | 60.0 | — | — | 18.4 | — | — |
| Glucose | 2.0 | — | 2.5 | — | — | 0 | — | — | 0 | — | — |
| 2-Ethyl-1-Hexanol | 50.0 | — | 71.0 | — | — | 0 | — | — | 53.0 | — | — |
| n-Hexanol | 17.0 | — | 24.0 | — | — | 0 | — | — | 18.0 | — | — |
| Total | 100.0 | 5.5 | 100.0 | 4.0 | 6.1 | 100.0 | 1.2 | 73.0 | 100.0 | 0.3 | 5.0 |

*The condensible aqueous portion of the heterogeneous azeotrope is about 25 weight percent HCl. If this liquid is cooled and used to scrub the noncondensibles off the partial condenser (No. 9 of FIG. 1), the resulting liquid is 40 percent HCl in water.

This data demonstrates the separation and recovery of concentrated hydrochloric acid from an acid-rich extract by continuous distillation. 73 Percent of the hydrochloric acid was recovered at 40 percent strength in the aqueous portion of the distillate with 6.1 percent remaining in the bottoms product of the column. Heterogeneous distillate samples were here taken with 5 percent of the hydrochloric acid recovered in the light organic distillate phase. The 84.1 percent material balance on hydrochloric acid is due principally to flow rate inaccuracies and the acid in the column.

Here, as with the following examples, no attempt was made to predict distillation characteristics because of the nonideal, azeotropic nature of the alcohols with water and the hydrochloric acid with water. Moreover, no attept was made to optimize hydrochloric acid recovery or minimize the acid content of the bottoms recycle stream. Thus the recovery data presented here and in the following examples are subject to improvement with further, standard engineering technique.

Figure 4:
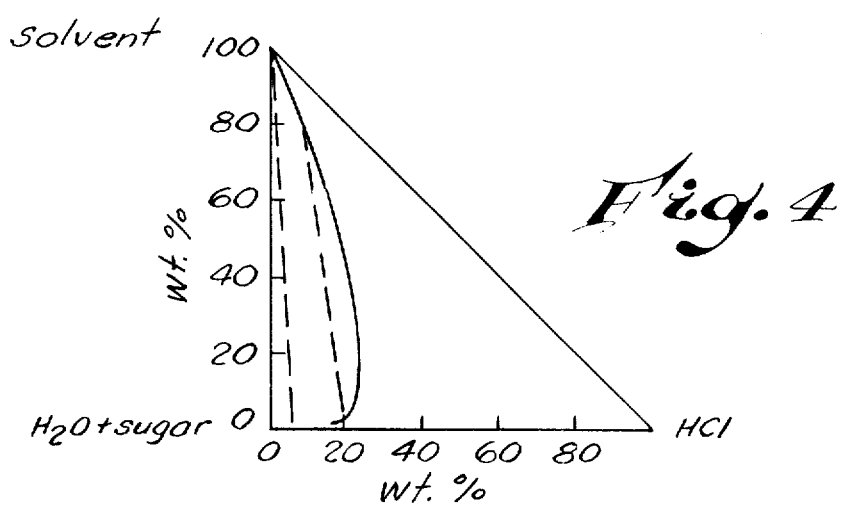
FIG. 4 is a pseudo-ternary diagram for extraction of concentrated hydrochloric acid (~36 weight percent) from an actual hydrolysate mixture using the solvent of Example 3.
Figure 5:
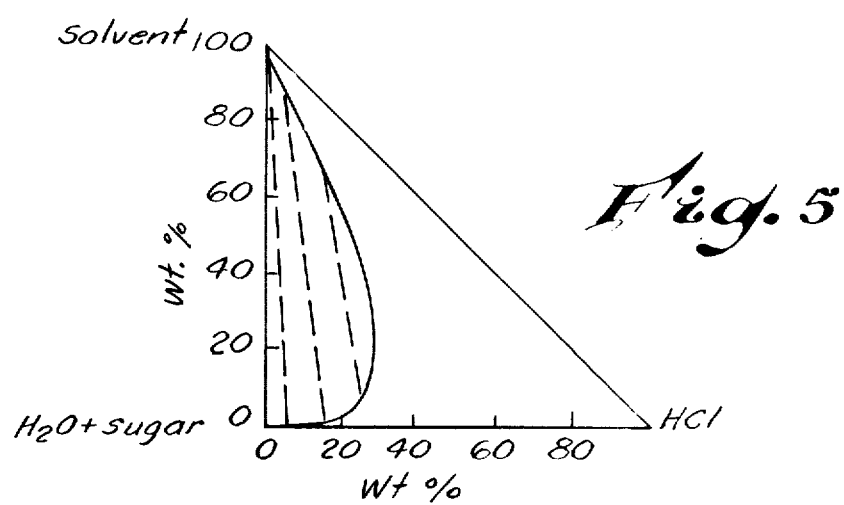
FIG. 5 is a pseudo-ternary diagram for extraction of concentrated hydrochloric acid (~44 weight percent) from an actual hydrolysate mixture using the solvent of Example 4.

The following examples are further illustrations of this invention. FIG. 3 relates also to Example 2, FIG. 4 to Example 3, and FIG. 5 to Example 4. The procedure of Example 1 was repeated in each of these examples.

EXAMPLE 2

Extraction and Recovery of Concentrated Hydrochloric Acid from an Actual Corn Husk Hydrolysate Mixture using 75:25 Weight Ratio 2-Ethyl-1-Hexanol:n-Hexanol

TABLE V

| Extractor Operating Conditions | | |
|---|---|---|
| Item | Value | Unit |
| Diameter | 1 | inch |
| Stroke Length | ½ | inch |
| Plate Spacing | 1 | inch |
| No. of Plates | 120 | — |
| Active Plate Height | 10 | foot |
| Agitation | 120 | per minute (pm) |
| Agitation Intensity | 60 | pm × stroke/spacing |
| Temperature | 25 | °C. |
| Time at Conditions | 60 | minute |

TABLE VI

Extraction Results

| Component | Hydrolysate Wt. % | Hydrolysate Flow g/min | Solvent Wt. % | Solvent Flow g/min | Extract Wt. % | Extract Flow g/min | Extract HCl Recov. % fed | Raffinate Wt. % | Raffinate Flow g/min | Raffinate HCl Loss % fed | Sugar Recov. % fed |
|---|---|---|---|---|---|---|---|---|---|---|---|
| HCl | 31.0 | — | 0 | — | 11.5 | — | 84.0 | 14.9 | — | 11.3 | — |
| H$_2$O | 62.8 | — | 0 | — | 22.1 | — | — | 59.7 | — | — | — |
| Carbohydrates* | 3.2 | — | 0 | — | 0.1 | — | — | 12.8 | — | — | 94.1 |
| Lignin | 3.0 | — | 0 | — | 0 | — | — | 12.6 | — | — | — |
| 2-Ethyl-1-Hexanol | 0 | — | 75.0 | — | 50.6 | — | — | 0 | — | — | — |
| n-Hexanol | 0 | — | 25.0 | — | 15.7 | — | — | 0 | — | — | — |
| Total | 100.0 | 34.0 | 100.0 | 51.0 | 100.0 | 77.0 | 84.0 | 100.0 | 8.0 | 11.3 | 94.1 |

*Mixture of multiple sugars including glucose, xylose and reversion sugars.

TABLE VII

Distillation Column Operating Conditions

| Item | Value | Unit |
|---|---|---|
| Type | Sieve Plate | — |
| Diameter | 28 | mm |
| No. of Plates | 20 | — |
| Feed Plate | 10 | — |
| Distillate Condenser | Partial | — |
| Noncondensibles Recovery | Water Scrubber | — |
| L/D* | 1.4:1 | wt:wt |
| Azeotrope | Heterogeneous** | — |
| Distillate phase ratio | 0.4:1 | Organic:Aqueous |
| Feed Flows | 330 | g/hr |
| Bottoms Flows | 240 | g/hr |
| Distillate Flows | 90 | g/hr |
| Feed Temp. | 92 | °C. |
| Bottoms Temp. | 140 | °C. |
| Distillate Temp. | 102 | °C. |

*L/D = Liquid reflux to distillate withdrawal ratio.
**Continuous decantation = total distillate was allowed to separate into a light organic phase and a heavy aqueous phase and the light organic phase was returned to the distillation column.

EXAMPLE 3

Extraction and Recovery of Concentrated Hydrochloric Acid from a Synthetic Hydrolysate Mixture using 70:30 Weight Ratio 2-Ethyl-1-Hexanol:Dowanol ® PiB-T

TABLE IX

Extractor Operating Conditions

| Item | Value | Unit |
|---|---|---|
| Diameter | 1 | inch |
| Stroke Length | ½ | inch |
| Plate Spacing | 1 | inch |
| No. of Plates | 120 | — |
| Active Plate Height | 10 | foot |
| Agitation | 80 | per minute (pm) |
| Agitation Intensity | 40 | pm × stroke/spacing |
| Temperature | 25 | °C. |
| Time at Conditions | 60 | minute |

TABLE VIII

Continuous Distillation Results

| Component | Extract Feed Wt. % | Extract Feed Flow g/min | Solvent Bottoms Wt. % | Solvent Bottoms Flow g/min | Solvent Bottoms HCl Recov. % fed | Concentrated Acid Distillate Aqueous Wt. % | Concentrated Acid Distillate Aqueous Flow g/min | Concentrated Acid Distillate Aqueous HCl Recov. % fed | Concentrated Acid Distillate Organic Wt. % | Concentrated Acid Distillate Organic Flow g/min | Concentrated Acid Distillate Organic HCl Recov. % fed |
|---|---|---|---|---|---|---|---|---|---|---|---|
| HCl | 11.5 | — | 1.2 | — | 7.6 | 44.6* | — | 85.0 | 4.7 | — | 0.3 |
| H$_2$O | 21.5 | — | 0.2 | — | — | 55.4 | — | — | 6.8 | — | — |
| Carbohydrate** | 0.1 | — | 0.1 | — | — | 0 | — | — | 0 | — | — |
| Unknowns*** | 0.6 | — | 1.8 | — | — | 0 | — | — | 51.1 | — | — |
| 2-Ethyl-1-Hexanol | 50.6 | — | 75.1 | — | — | 0 | — | — | 7.5 | — | — |
| n-Hexanol | 15.7 | — | 21.7 | — | — | 0 | — | — | 29.9 | — | — |
| Total | 100.0 | 5.5 | 100.0 | 4.0 | 7.6 | 100.0 | 1.2 | 85.0 | 100.0 | 0.04 | 0.3 |

*The condensible aqueous portion of the heterogeneous azeotrope is about 25 weight percent HCl. If this liquid is cooled and used to scrub the noncondensibles off the partial condenser (No. 9 of FIG. 1), the resulting liquid is 44.6 percent HCl in water.
**Mixture of multiple sugars including glucose, xylose and reversion sugars.
***Detected by gas chromatography but not identified. Probably includes furfural, acetic acid and alcohol degradation products such as alkyl halides (e.g., 1-chlorohexane).

TABLE X

Extraction Results

| Component | Hydrolysate Wt. % | Hydrolysate Flow g/min | Solvent Wt. % | Solvent Flow g/min | Extract Wt. % | Extract Flow g/min | Extract HCl Recov. % fed | Raffinate Wt. % | Raffinate Flow g/min | Raffinate HCl Loss % fed | Sugar Recov. % fed |
|---|---|---|---|---|---|---|---|---|---|---|---|
| HCl | 31.2 | — | 0 | — | 12.3 | — | 85.4 | 10.1 | — | 16.1 | — |
| H$_2$O | 56.4 | — | 0 | — | 21.7 | — | — | 67.2 | — | — | — |
| Glucose | 12.4 | — | 0 | — | 0.6 | — | — | 22.0 | — | — | 88.7 |
| 2-Ethyl-1-Hexanol | 0 | — | 70.0 | — | 52.3 | — | — | 0.5 | — | — | — |
| Dowanol ® PiB-T | 0 | — | 30.0 | — | 13.1 | — | — | 0.2 | — | — | — |
| Total | 100.0 | 60.0 | 100.0 | 100.0 | 100.0 | 130.0 | 85.4 | 100.0 | 30.0 | 16.1 | 88.7 |

TABLE XI

| Distillation Column Operating Conditions | | |
|---|---|---|
| Item | Value | Unit |
| Type | Sieve Plate | — |
| Diameter | 28 | mm |
| No. of Plates | 20 | — |
| Feed Plate | 10 | — |
| Distillate Condensate | Partial | — |
| Noncondensibles Recovery | Water Scrubber | — |
| L/D* | 2:1 | wt:wt |
| Azeotrope | Heterogeneous** | — |

| | | |
|---|---|---|
| Distillate phase ratio | 1:1 | Organic:Aqueous |
| Feed Flows | 160 | g/hr |
| Bottoms Flows | 127 | g/hr |
| Distillate Flows | 33 | g/hr |
| Feed Temp. | 98 | °C. |
| Bottoms Temp. | 165 | °C. |
| Distillate Temp. | 105 | °C. |

*L/D=Liquid reflux to distillate withdrawal ratio.
**Continuous decantation=total distillate was allowed to separate into a light organic phase and a heavy aqueous phase and the light organic phase was returned to the distillation column.

TABLE XII

| | Continuous Distillation Results | | | | | | | | |
|---|---|---|---|---|---|---|---|---|---|
| | Extract Feed | | Solvent Bottoms | | Concentrated Acid Distillate | | | | |
| | | | | | Aqueous | | | Organic | |
| Component | Wt. % | Flow g/min | Wt. % | Flow g/min | HCl Recov. % fed | Wt. % | Flow g/min | HCl Recov. % fed | Wt. % | Flow g/min | HCl Recov. % fed |
| HCl | 12.3 | — | 1.1 | — | 7.0 | 35.0* | — | 64.0 | — | — | 0 |
| H₂O | 21.7 | — | 4.7 | — | — | 65.0 | — | — | — | — | — |
| Glucose | 0.6 | — | 0.8 | — | — | 0 | — | — | — | — | — |
| Unknowns** | 0 | — | 0.7 | — | — | 0 | — | — | — | — | — |
| 2-Ethyl-1-Hexanol | 52.3 | — | 66.7 | — | — | 0 | — | — | — | — | — |
| Dowanol® PiB-T | 13.1 | — | 26.0 | — | — | 0 | — | — | — | — | — |
| Total | 100.0 | 2.7 | 100.0 | 2.1 | 7.0 | 100.0 | 0.6 | 64.0 | 100.0 | 0 | 0 |

*The condensible aqueous portion of the heterogeneous azeotrope is about 25 weight percent HCl. If this liquid is cooled and used to scrub the noncondensibles off the partial condenser (No. 9 of FIG. 1), the resulting liquid is 35 percent HCl in water.
**Detected by gas chromatography but not identified. Probably includes furfural, acetic acid and alcohol degradation products, such as alkyl halides (e.g., 1-chlorohexane).

EXAMPLE 4

Extraction and Recovery of Concentrated Hydrochloric Acid from a Synthetic Hydrolysate Mixture using 2-Ethyl-1-Butanol

TABLE XIII

| Extractor Operating Conditions | | |
|---|---|---|
| Item | Value | Unit |
| Diameter | 1 | inch |
| Stroke Length | ½ | inch |

TABLE XIII-continued

| Extractor Operating Conditions | | |
|---|---|---|
| Item | Value | Unit |
| Plate Spacing | 1 | inch |
| No. of Plates | 120 | — |
| Active Plate Height | 10 | foot |
| Agitation | 90 | per minute (pm) |
| Agitation Intensity | 45 | pm × stroke/spacing |
| Temperature | 25 | °C. |
| Time at Conditions | 45 | minute |

TABLE XIV

| | Extraction Results | | | | | | | | | | |
|---|---|---|---|---|---|---|---|---|---|---|---|
| | Hydrolysate | | Solvent | | Extract | | | Raffinate | | | |
| Component | Wt. % | Flow g/min | Wt. % | Flow g/min | Wt. % | Flow g/min | HCl Recov. % fed | Wt. % | Flow g/min | HCl Loss % fed | Sugar Recov. % fed |
| HCl | 32.3 | — | 0 | — | 12.2 | — | 99.8 | 7.4 | — | 8.1 | — |
| H₂O | 55.3 | — | 0 | — | 15.2 | — | — | 69.0 | — | — | — |
| Glucose | 12.4 | — | 0 | — | 1.6 | — | — | 22.6 | — | — | 65.1 |
| 2-Ethyl-1-Butanol | 0 | — | 100.0 | — | 71.0 | — | — | 1.0 | — | — | — |
| Total | 100.0 | 70.0 | 100.0 | 140.0 | 100.0 | 185.0 | 99.8 | 100.0 | 25.0 | 8.1 | 65.1 |

TABLE XV

| Distillation Column Operating Conditions | | |
|---|---|---|
| Item | Value | Unit |
| Type | Sieve Plate | — |
| Diameter | 28 | mm |
| No. of Plates | 20 | — |
| Feed Plate | 10 | — |
| Distillate Condenser | Partial | — |
| Noncondensibles Recovery | Water Scrubber | — |
| L/D* | 3.8:2.8 | wt:wt |
| Azeotrope | Heterogeneous** | — |

| | | |
|---|---|---|
| Distillate phase retio | 1:2.8 | Organic:Aqueous |
| Feed Flows | 200 | g/hr |
| Bottoms Flows | 150 | g/hr |
| Distillate Flows | 50 | g/hr |
| Feed Temp. | 100 | °C. |
| Bottoms Temp. | 125 | °C. |
| Distillate Temp. | 95 | °C. |

*L/D=Liquid reflux to distillate withdrawal ratio.
**Continuous decantation=total distillate was allowed to separate into a light organic phase and a heavy aqueous phase and the light organic phase was returned to the distillation column.

TABLE XVI

Continuous Distillation Results

| | Extract Feed | | Solvent Bottoms | | | Concentrated Acid Distillate | | | | | |
| | | | | | | Aqueous | | | Organic | | |
| Component | Wt. % | Flow g/min | Wt. % | Flow g/min | HCl Recov. % fed | Wt. % | Flow g/min | HCl Recov. % fed | Wt. % | Flow g/min | HCl Recov. % fed |
|---|---|---|---|---|---|---|---|---|---|---|---|
| HCl | 12.2 | — | 2.3 | — | 14.3 | 43.0* | — | 85.4 | 12.4 | — | 0 |
| H$_2$O | 15.2 | — | 4.1 | — | — | 57.0 | — | — | 14.6 | — | — |
| Glucose | 1.6 | — | 2.6 | — | — | 0 | — | — | 0 | — | — |
| 2-Ethyl-1-Butanol | 71.0 | — | 91.0 | — | — | 0 | — | — | 73.0 | — | — |
| Total | 100.0 | 3.3 | 100.0 | 2.5 | 14.3 | 100.0 | 0.8 | 85.4 | 100.0 | 0 | 0 |

*The condensible aqueous portion of the heterogeneous azeotrope is about 25 weight percent HCl. If this liquid is cooled and used to scrub the noncondensibles off the partial condenser (No. 9 of FIG. 1), the resulting liquid is 43 percent HCl in water.

The data of Examples 2, 3 and 4 demonstrate several features of this invention. First, it shows the utility of various alcohols, both neat and diluted, within the claimed class. Second, Example 2 clearly demonstrates the invention with an actual corn husk hydrolysate mixture. Of significance is the excellent extractive results (94 percent sugar recovery) despite the presence of lignin. Third, these results were obtained without any special attempt to maximize recovery figures.

Although this invention has been described in considerable detail by the above examples, such detail is for the purpose of illustration only and is not to be construed as a limitation upon the invention. Many variations can be had without departing from the spirit and scope of the appended claims.

What is claimed is:

1. A process for separating and recovering concentrated hydrochloric acid from the crude product produced from the acid hydrolysis of a cellulose-containing material, the crude product comprising concentrated hydrochloric acid and the sugars produced from the acid hydrolysis of the cellulose-containing material, into a first fraction comprising the concentrated hydrochloric acid and a second fraction comprising the sugars, the process comprising:
   (1) contacting the crude product with an organic solvent consisting essentially of at least one C$_5$–C$_9$ alcohol such that the organic solvent is enriched with the concentrated hydrochloric acid,
   (2) separating the enriched organic solvent from the concentrated hydrochloric acid depleted crude product, and
   (3) recovering the concentrated hydrochloric acid from the enriched organic solvent.

2. The process of claim 1 wherein the crude product and organic solvent are contacted in a counter-current fashion.

3. The process of claim 2 wherein the organic solvent consists essentially of at least one primary isomer of a C$_5$–C$_9$ alcohol.

4. The process of claim 3 wherein the organic solvent is selected from the group consisting of a mixture consisting essentially of between about 60 and about 90 weight percent 2-ethyl-1-hexanol and between about 10 and about 40 weight percent n-hexanol, a mixture consisting essentially of between about 55 and about 85 weight percent 2-ethyl-1-hexanol and between about 15 and about 45 weight percent of a polyglycol ether having a distillation temperature in excess of about 175° C., and essentially about 100 weight percent 2-ethyl-1-butanol.

5. The process of claim 3 wherein the organic solvent is a mixture consisting essentially of between about 60 and about 90 weight percent 2-ethyl-1-hexanol and between about 10 and about 40 weight percent n-hexanol.

6. The process of claim 4 or 5 wherein the cellulose-containing material is a forest or agricultural material.

7. The process of claim 6 wherein the concentrated hydrochloric acid is at least about a 20 weight percent aqueous solution of hydrogen chloride.

8. The process of claim 6 wherein the concentrated hydrochloric acid is about a 30–45 weight percent aqueous solution of hydrogen chloride.

9. The process of claim 6 wherein the concentrated hydrochloric acid is about a 35–45 weight percent aqueous solution of hydrogen chloride.

* * * * *